United States Patent
Choi et al.

(10) Patent No.: US 12,013,492 B2
(45) Date of Patent: Jun. 18, 2024

(54) MEMS SCANNER FOR DETECTING ROTATIONAL ANGLE OF MIRROR

(71) Applicant: LG Electronics Inc., Seoul (KR)

(72) Inventors: Juchan Choi, Seoul (KR); Jideok Kim, Seoul (KR); Sangok Yeo, Seoul (KR)

(73) Assignee: LG Electronics Inc., Seoul (KR)

( * ) Notice: Subject to any disclaimer, the term of this patent is extended or adjusted under 35 U.S.C. 154(b) by 399 days.

(21) Appl. No.: 17/259,261

(22) PCT Filed: Dec. 12, 2018

(86) PCT No.: PCT/KR2018/015789
§ 371 (c)(1),
(2) Date: Jan. 11, 2021

(87) PCT Pub. No.: WO2020/122278
PCT Pub. Date: Jun. 18, 2020

(65) Prior Publication Data
US 2021/0293935 A1    Sep. 23, 2021

(51) Int. Cl.
*G01S 7/481* (2006.01)
*G01S 17/931* (2020.01)
*G02B 26/08* (2006.01)
*G02B 26/10* (2006.01)

(52) U.S. Cl.
CPC .......... *G01S 7/4817* (2013.01); *G01S 17/931* (2020.01); *G02B 26/085* (2013.01); *G02B 26/101* (2013.01)

(58) Field of Classification Search
None
See application file for complete search history.

(56) References Cited

U.S. PATENT DOCUMENTS

| | | | |
|---|---|---|---|
| 7,187,100 B2 | 3/2007 | Fu | |
| 2005/0094296 A1* | 5/2005 | Murakami | G02B 26/105 359/872 |
| 2009/0109512 A1* | 4/2009 | Park | G02B 26/0833 359/198.1 |
| 2009/0134319 A1 | 5/2009 | Sprague et al. | |
| 2009/0244668 A1 | 10/2009 | Fujino et al. | |

FOREIGN PATENT DOCUMENTS

| | | |
|---|---|---|
| JP | 2005308820 | 11/2005 |
| KR | 20170085875 | 7/2017 |

OTHER PUBLICATIONS

International Search Report in International Appln. No. PCT/KR2018/015789, dated Sep. 11, 2019, 7 pages (with English translation).

* cited by examiner

*Primary Examiner* — Jennifer D. Carruth
(74) *Attorney, Agent, or Firm* — Fish & Richardson P.C.

(57) ABSTRACT

A MEMS scanner is disclosed. The MEMS scanner includes a mirror rotatable about at least one rotational axis, a gimbal disposed outside the mirror, a spring connected to the gimbal on the same line as the rotational axis of the mirror, a substrate spaced apart from an outer surface of the gimbal and connected to the gimbal via the spring, a coil disposed on the gimbal so as to adjust a rotational angle of the mirror by generating electromagnetic force by interaction with a magnetic field, which is first formed therearound, when current flows therethrough, and a plurality of combs formed between the substrate and at least one of the spring and the gimbal adjacent to the substrate so as to detect the rotational angle of the mirror.

9 Claims, 13 Drawing Sheets

MEMS SCANNER FOR DETECTING ROTATIONAL ANGLE OF MIRROR

CROSS-REFERENCE TO RELATED APPLICATIONS

This application is a National Stage application under 35 U.S.C. § 371 of International Application No. PCT/KR2018/015789, filed on Dec. 12, 2018. The disclosure of the prior application is incorporated by reference in its entirety.

TECHNICAL FIELD

The present disclosure relates to a MEMS scanner, and more particularly to a MEMS scanner capable of detecting the rotational angle of a mirror, which is rotated by electromagnetic force, by measuring a capacitance value of a comb structure.

BACKGROUND ART

Optically-based MEMS scanners are being developed for application to projector-based displays. These days, research into a MEMS scanner capable of being applied to a vehicular lidar is being performed.

It is typical to use electromagnetic force or electrostatic force as driving force for rotating a mirror of a MEMS scanner.

Although a conventional electromagnetic-driving-type MEMS scanner is provided with a strain gauge mounted on an elastic body or a spring thereof for supporting rotation of a mirror in order to detect the rotational angle of the mirror, there are problems in which it is complicated to layer a plurality of electric wires for rotation of the mirror or for electrical connection of the strain gauge onto the spring into a multi-layered structure and in which the integration degree thereof is lowered.

Hence, because the load applied to the spring is increased, there are problems in which power consumption required for rotation of the mirror is increased and the durability of the spring is deteriorated.

DISCLOSURE

Technical Problem

Therefore, the present disclosure has been made in view of the above problems, and it is a first object of the present disclosure to provide a MEMS scanner capable of realizing both a structure for rotation of a mirror and a structure for detection of a rotational angle of the mirror.

A second object of the present disclosure is to provide a MEMS scanner capable of making it easy to adjust the number or positions of components for detecting the rotational angle of a mirror in response to the shape or the rotational angle of the mirror.

A third object of the present disclosure is to provide a MEMS scanner capable of ensuring reliability and durability of components for detecting the rotational angle of a mirror.

The objects of the present disclosure are not limited to the above-mentioned objects. Other specific details of the present disclosure will be apparent to those skilled in the art from the following detailed description and the embodiments of the present disclosure.

Technical Solution

In order to achieve the above objects, a MEMS scanner according to the present disclosure includes a mirror rotatable about at least one rotational axis, a gimbal disposed outside the mirror, a spring connected to the gimbal on the same line as the rotational axis of the mirror, a substrate spaced apart from the outer surface of the gimbal and connected to the gimbal via the spring, a coil disposed on the gimbal so as to adjust the rotational angle of the mirror by generating electromagnetic force by interaction with a magnetic field, which is first formed therearound, when current flows therethrough, and a plurality of combs formed between the substrate and at least one of the spring and the gimbal adjacent to the substrate so as to detect the rotational angle of the mirror.

The plurality of combs may include a plurality of cantilever-shaped first combs, which are arranged at predetermined intervals and which extend from the substrate, and a plurality of cantilever-shaped second combs, which are arranged at predetermined intervals and which extend from at least one of the spring and the gimbal adjacent to the first combs.

The rotational angle of the mirror may be detected by measuring a capacitance value corresponding to the distance between the first and second combs, which varies with the rotation of the mirror.

The thickness of each of the first and second combs may be decreased moving toward a portion of the plurality of the second combs, at which deformation thereof is increased.

The length of each of the first and second combs may be decreased moving toward a portion of the plurality of second combs at which deformation thereof is increased.

The distance between the first and second combs may be increased moving toward the portion of the plurality of second combs at which deformation thereof is increased.

The thickness of each of the plurality of second combs may be smaller than the thickness of each of the plurality of first combs.

Details of other embodiments are disclosed in the detailed description and the attached drawings.

Advantageous Effects

The present disclosure offers one or more of the following effects.

First, it is possible to detect the rotational angle of a mirror by measuring a capacitance value corresponding to the distance between combs formed between a substrate and a spring or a gimbal.

Second, it is possible to easily detect the rotational angle of a mirror by adjusting the number of positions of components for detecting the rotational angle of the mirror in response to the shape or the rotational direction of the mirror.

Third, it is possible to ensure reliability and durability of combs by adjusting the thickness and length of the combs and the distance between the combs such that the combs are brought into contact with each other during rotation of the mirror.

BEST MODE

It will be understood that although the terms "first", "second", etc. may be used herein to describe various elements, these elements should not be limited by these terms. These terms are only used to distinguish one element from another.

It should be understood that, when an element is referred to as being "connected with" another element, there may be intervening elements present, or the element may be directly connected with the another element. In contrast, it should be understood that, when an element is referred to as being "directly connected with" another element, there are no intervening element present.

A singular representation may include a plural representation unless the context clearly indicates otherwise.

Terms such as "includes" or "has" used herein should be considered as indicating the presence of several features, numbers, steps, operations, elements, components or combinations thereof disclosed in the specification, but it should be understood that one or more other features, numbers, steps, operations, elements, components or combinations thereof may similarly be present or added.

Hereinafter, an example, to which a MEMS scanner according to the present disclosure is applied, will be described with reference to FIGS. 1 to 4.

Figure 1:
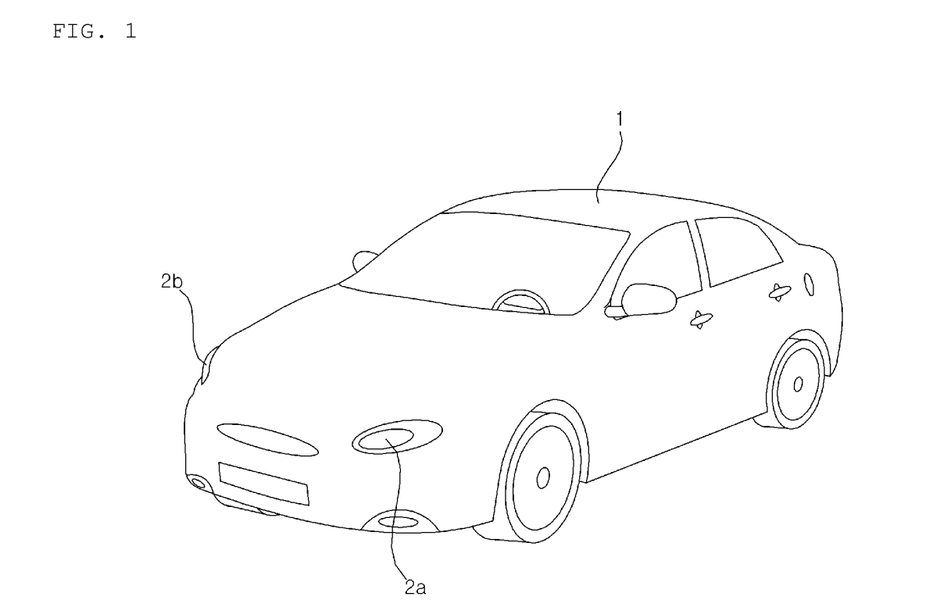
FIG. 1 is a view illustrating the appearance of a vehicle including a MEMS scanner according to the present disclosure.
Figure 2:
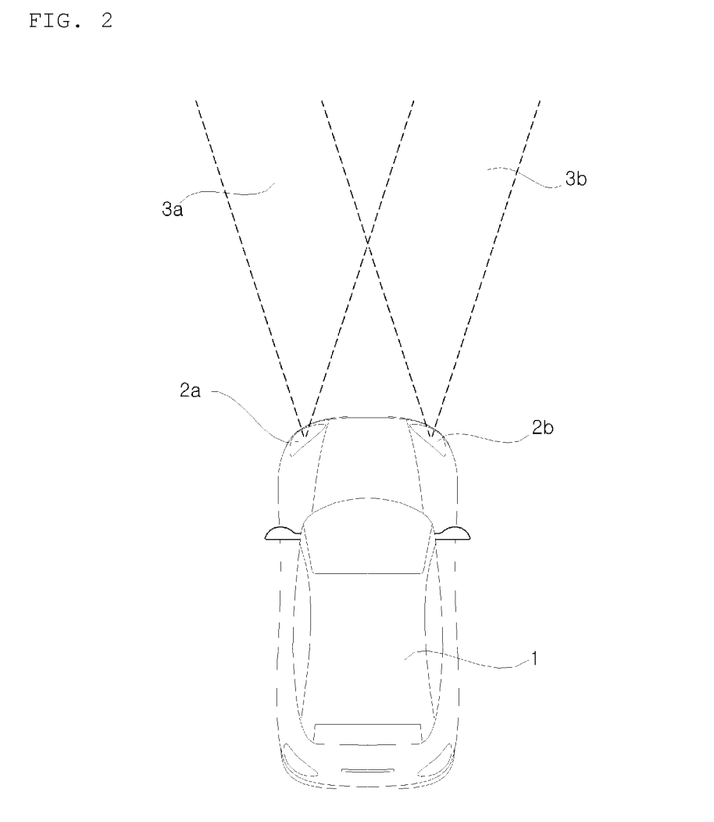
FIG. 2 is a view schematically illustrating a position of the MEMS scanner provided in the vehicle shown in FIG. 1.

FIG. 1 is a view illustrating the appearance of a vehicle including a MEMS scanner according to the present disclosure. FIG. 2 is a view schematically illustrating the position of the MEMS scanner provided in the vehicle shown in FIG. 1.

In order to explain the MEMS (Micro Electro Mechanical System) 100 according to the present disclosure, by way of example, the MEMS scanner 100 is considered to be a scanner for outputting light to the outside of the vehicle for lidars 2a and 2b of the vehicle.

As illustrated in FIGS. 1 and 2, the lidars 2a and 2b, each of which includes the MEMS scanner 100, may be disposed at a left front side and a right front side of the vehicle 1.

Each of the MEMS scanners 100 provided in the lidars 2a and 2b is able to output scanning light 3a and 3b in the forward direction of the vehicle.

Each of the MEMS scanners 100 provided in the lidars 2a and 2b is able to output the scanning light 3a and 3b to several tens to several hundreds of meters in the forward direction of the vehicle. The scanning lights 3a and 3b may be infrared light and may have a wavelength of 900-1,550 nm.

Figure 3:
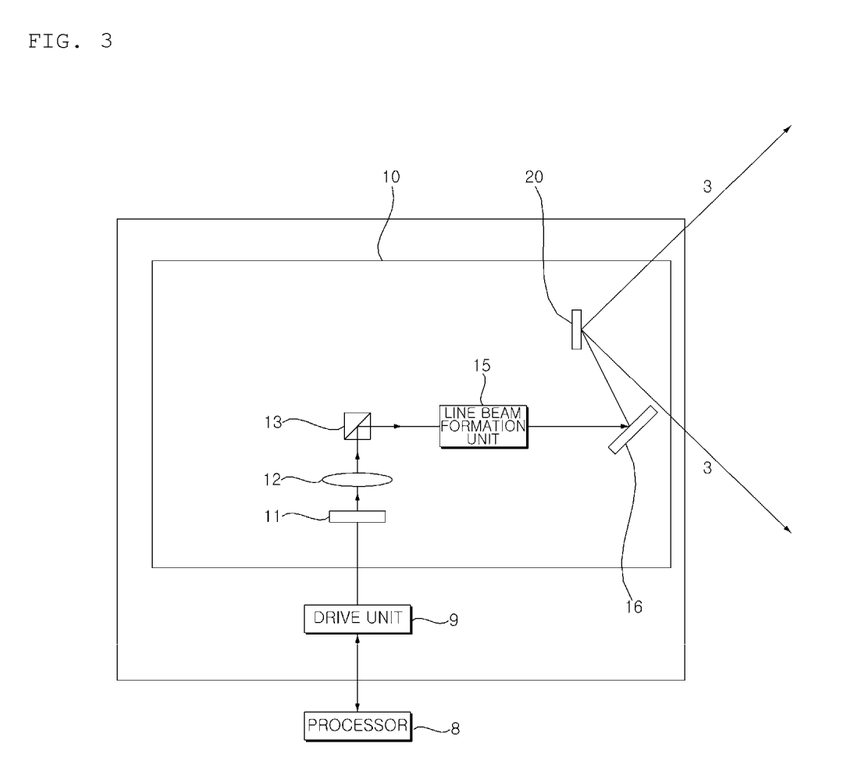
FIG. 3 is a block diagram illustrating the interior of a light output unit including the MEMS scanner according to the present disclosure.

FIG. 3 is a block diagram illustrating the interior of a light output unit including the MEMS scanner according to the present disclosure.

As illustrated in FIG. 3, the light output unit 10 is able to output a scanning light 3 to the outside of the vehicle.

The light output unit 10 may be a laser diode, which is a light source having high linearity, in order to output the scanning light 3.

The light output unit 10 may include a light source unit 11 for outputting infrared light and a drive unit 9 for driving the light source unit 11. Here, the light source unit 11 is able to output infrared light having a wavelength of about 900-1,550 nm.

The light source unit 11 may be driven in response to an electric signal from the drive unit 9. The electric signal from the drive unit 9 may be controlled by a processor 8.

The infrared light output from the light source unit 11 is collimated through individual collimator lenses in a collimating unit 12.

A first light reflection unit 13 may reflect the infrared light output from the light source unit 11 or the collimation unit 12 and may output the infrared light, the path of which is changed, in one direction. To this end, the first light reflection unit 13 may include a 1D MEMS mirror.

By way of example, the first light reflection unit 13 may reflect the infrared light output from the light source unit 11 or the collimation unit 12 and may output the infrared light, the path of which is changed, toward a scanner module 20.

A line beam formation unit 15 may form the light from the first light reflection unit 13 into a line beam. Particularly, the line beam formation unit 15 may form and output a linear line beam in consideration of the scanner module 20, which is capable of performing only unidirectional scanning.

A second light reflection unit 16 may reflect a line beam from the line beam formation unit 222 toward the scanner module 20. To this end, the second light reflection unit 16 may include a total mirror (TM).

The scanner module 20 may cause the line beam reflected by the second light reflection unit 16 to be scanned in a first direction.

In other words, the scanner module 20 may sequentially and repeatedly scan the line beam in the first direction.

Accordingly, the scanning light 3, which is infrared light, may be output to the outside.

Figure 4:
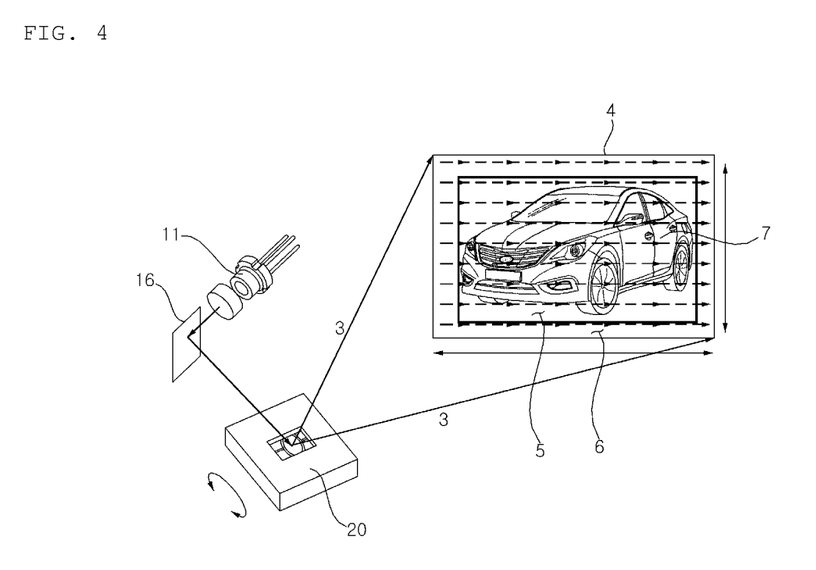
FIG. 4 is a view illustrating a scanning process in light projection of the scanner module of FIG. 3.

FIG. 4 is a view illustrating a scanning process in light projection of the scanner module of FIG. 3.

As illustrated in FIG. 4, the light from the light source unit 11 may be input to the scanner module 20 through the first light reflection unit 13, the line beam formation unit 15 and the second light reflection unit 16, and the scanner module 20 may sequentially and repeatedly perform first directional scanning of the light or the line beam input thereto.

As illustrated in FIG. 4, the scanner module 20 may scan a scannable portion of an outside area 4 from the left side to the right side in a first direction, which is an inclined direction or a horizontal direction. The scanning operation may be repeatedly performed with respect to the entire outside area 4.

By virtue of the scanning operation, it is possible to output the scanned infrared light to the outside.

The outside area 4 may be divided into a first area 5 and a second area 6. The first area 5 may be an area including an external object 7, that is, an active area 5, and the second area 6 may be an area not including the outside object 7, that is, a blank area 6.

Accordingly, the entire scanning zone may also be divided into a first scanning zone corresponding to the active area 5 including the external object 7 and a second zone corresponding to the blank area 4 not including the external object 7.

Figure 5:
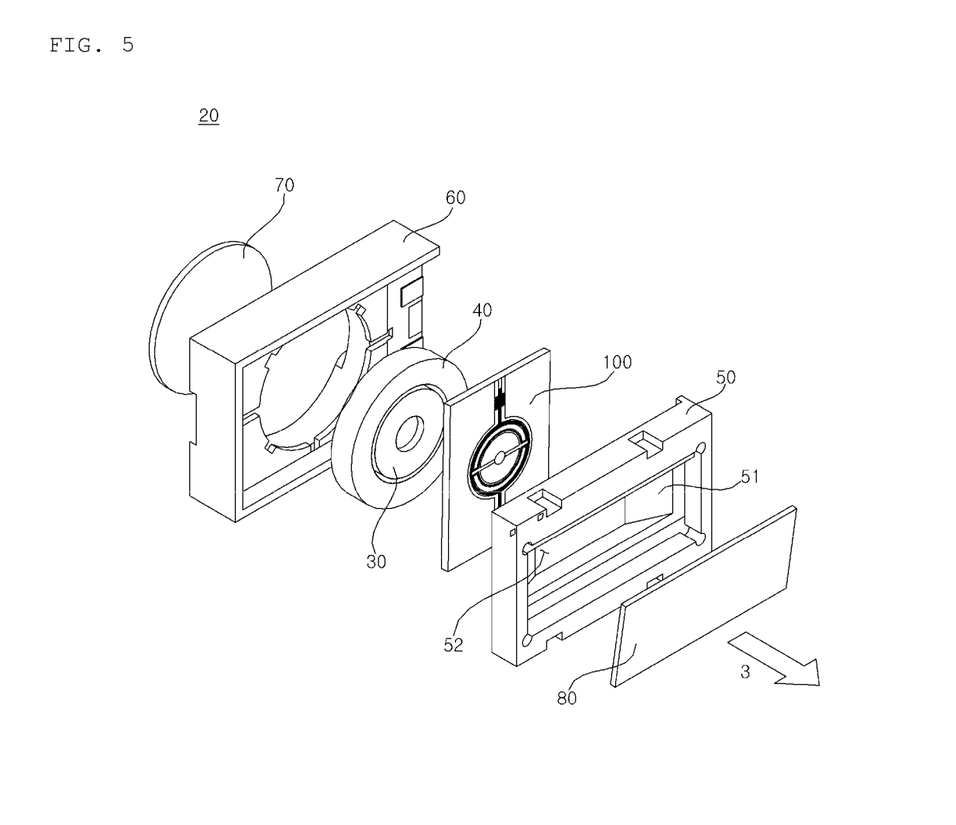
FIG. 5 is a perspective view of the scanner module according to the present disclosure.

Hereinafter, the construction of the scanner module including the MEMS scanner according to the present disclosure will be described.

FIG. 5 is a perspective view of the scanner module according to the present disclosure.

Generally, electromagnetic force or electrostatic force is used as driving force for rotating the MEMS scanner mirror, and there is an advantage or a disadvantage depending on the driving manner.

The MEMS scanner 100 according to the present disclosure adopts an electromagnetic driving system capable of being driven with a wide angle at a high speed.

A conventional electromagnetic-driving-type MEMS scanner 100 has a problem in that a component for detecting the rotational angle of a mirror 120 to be described later (for example, a strain gauge) must be mounted through an additional process. The present disclosure has been advised in order to solve the above problem.

As illustrated in FIG. 5, the scanner module 20 according to the present disclosure may include the electromagnetic-driving-type MEMS scanner 100 including the mirror 120 for reflecting light, magnets 30 and 40 disposed on the rear surface of the MEMS scanner 100, a lower case 60 accommodating the magnets 30 and 40 therein, a yoke 70 corresponding to the magnets 30 and 40, and an upper case 50 including an opening 52 through which the light reflected by the MEMS scanner 100 passes.

The upper case 50 may include a sloped portion 51, which is in contact with a portion of the MEMS scanner 100 and which extends toward the mirror 120 from the surface thereof that is in contact with the MEMS scanner 100.

The front surface of the sloped portion 51 may be designed to have a surface inclined at a predetermined angle so as to avoid obstructing the outward output of light.

The yoke 70 may be disposed on the rear surface of the lower case 60 accommodating the magnets 30 and 40 therein.

The yoke 70 may be configured to correspond to the shape of the magnets 30 and 40, and may be made of soft magnetic material. The yoke 70 may become a passage through which magnetic flux, which is generated when current is applied thereto, passes.

The scanner module 20 may further include a transparent cover portion 80, which is made of a transparent material and which covers the opening 52.

In other words, the transparent cover portion 80 may be disposed on the front surface of the MEMS scanner 100 and may be made of a transparent member so as allow light to pass therethrough while hermetically closing the opening 52.

The transparent cover portion 80 may hermetically close the scanner module 20 so as to prevent the introduction of external dust and the like through the opening 52. Accordingly, it is possible to minimize the exposure of the MEMS scanner 10 to external fine material.

The transparent cover portion 80 may be coupled to the upper case 50 in the state of being inclined by a predetermined angle of inclination with respect to the MEMS scanner 100.

Hereinafter, the MEMS scanner 100 according to the present disclosure will be described in detail with reference to FIGS. 6 to 11.

Figure 6:
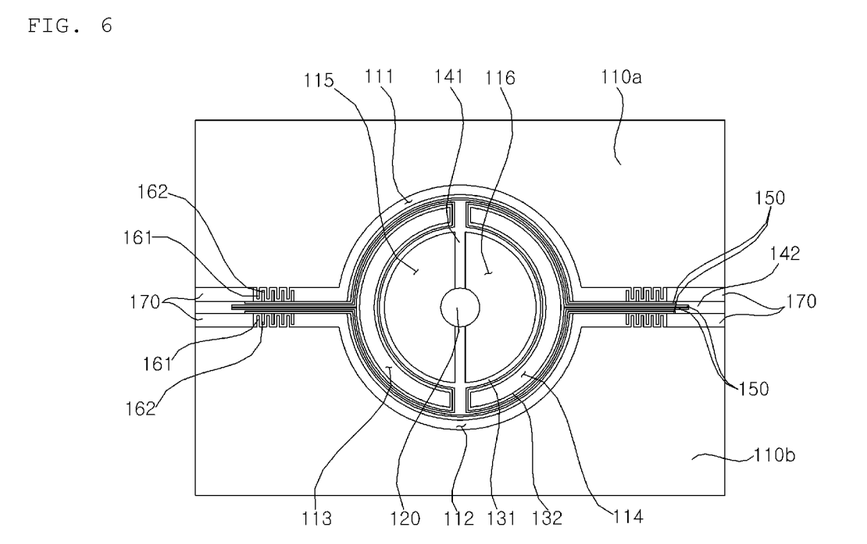
FIG. 6 is a view illustrating the front surface of the MEMS scanner according to a first embodiment of the present disclosure.
Figure 7:
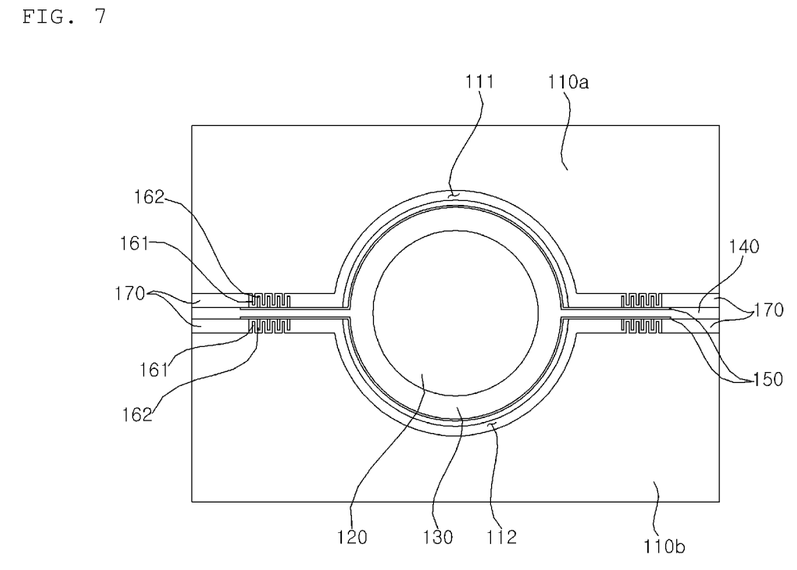
FIG. 7 is a view illustrating the front surface of the MEMS scanner according to a second embodiment of the present disclosure.
Figure 8:
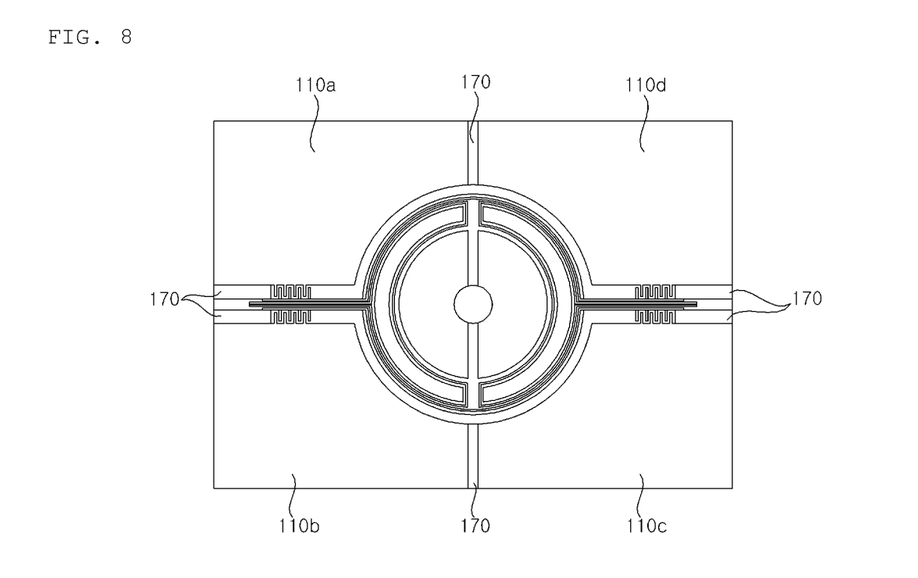
FIG. 8 is a view illustrating the front surface of the MEMS scanner according to a third embodiment of the present disclosure.
Figure 9:
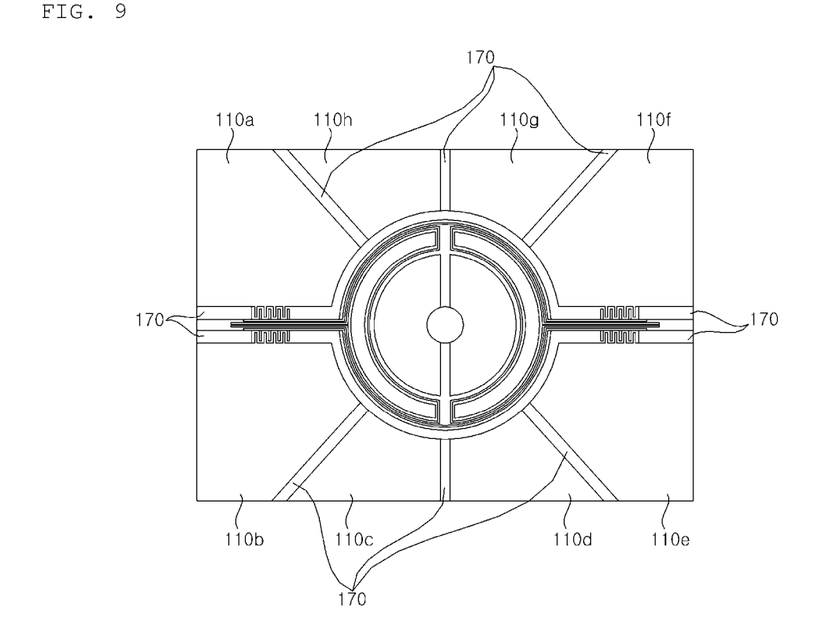
FIG. 9 is a view illustrating the front surface of the MEMS scanner according to a fourth embodiment of the present disclosure.
Figure 10:
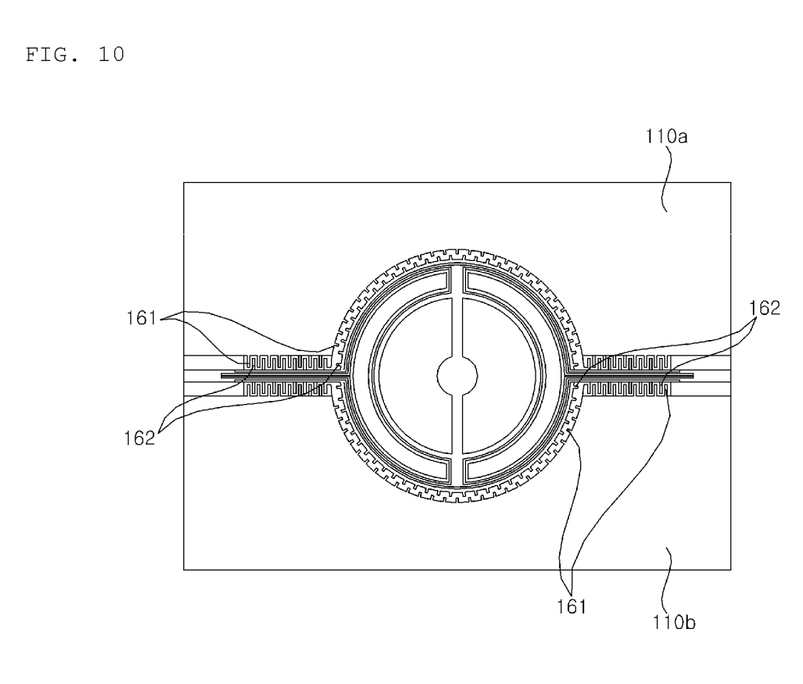
FIG. 10 is a view illustrating the front surface of the MEMS scanner according to a fifth embodiment of the present disclosure.
Figure 11:
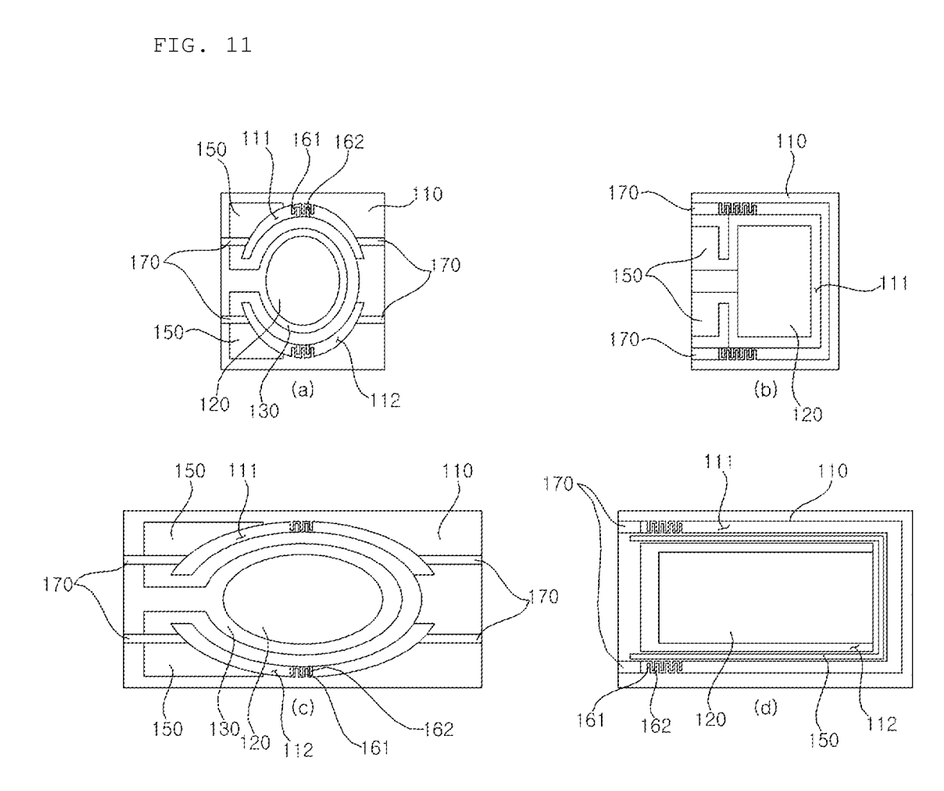
FIG. 11 is a view illustrating the front surfaces of the MEMS scanners according to sixth to ninth embodiments of the present disclosure.

FIG. 6 is a view illustrating the front surface of the MEMS scanner according to a first embodiment of the present disclosure. FIG. 7 is a view illustrating the front surface of the MEMS scanner according to a second embodiment of the present disclosure. FIG. 8 is a view illustrating the front surface of the MEMS scanner according to a third embodiment of the present disclosure. FIG. 9 is a view illustrating the front surface of the MEMS scanner according to a fourth embodiment of the present disclosure. FIG. 10 is a view illustrating the front surface of the MEMS scanner according to a fifth embodiment of the present disclosure. FIG. 11 is a view illustrating the front surfaces of the MEMS scanners according to sixth to ninth embodiments of the present disclosure.

As illustrated in FIG. 7, the mirror 120 of the MEMS scanner 100 according to a second embodiment of the present disclosure is able to rotate about one rotational axis.

Alternatively, as illustrated in FIGS. 6 and 8 to 10, the mirrors 120 of the MEMS scanner 100 according to first and third to fifth embodiments of the present disclosure are able to rotate about two rotational axes orthogonal to each other.

Since the MEMS scanners 100 according to the various embodiments of the present disclosure, which are shown in FIGS. 6 to 11, are distinguished from one another by the shapes or rotational directions of the mirrors 120 or the numbers or positions of combs 160, which will be described below, a description of one embodiment may be applied to another embodiment.

In this specification, the MEMS scanner 100 is first described based on the first embodiment of the present disclosure, and the MEMS scanner 100 according to other embodiments will be described based on the differences from the first embodiment.

As illustrated in FIG. 6, the MEMS scanner 100 includes a mirror 120, a gimbal 130, a spring 140, a substrate 110, a coil 150 and a comb 160.

The mirror 120 may reflect light.

The mirror 120 is able to rotate about at least one rotational axis. By way of example, as illustrated in FIG. 6, the mirror 120 may rotate about a vertical axis and a horizontal axis, and a detailed description thereof will be given later.

The gimbal 130 may be disposed outside the mirror 120.

The gimbal 130 may include a first gimbal 131 disposed so as to be spaced apart from the outer surface of the mirror 120 and a second gimbal 132 disposed so as to be spaced apart from the outer surface of the first gimbal 131.

Since the mirror 120 is spaced apart from the first gimbal 131, openings 115 and 116 may be defined between the mirror 120 and the first gimbal 131. Since the first gimbal 131 is spaced apart from the second gimbal 132, openings 113 and 114 may be defined between the first gimbal 131 and the second gimbal 132.

Particularly, since the openings 115 and 116 prevent optical interference, it may be advantageous in ensuring a wide angle of the mirror 120.

Although the first and second gimbals 131 and 132 are illustrated in FIG. 6 as being circular, the shapes of the first and second gimbals 131 and 132 are not limited thereto.

The spring 140 may be connected to the gimbal 130 on the same line as the rotational axis of the mirror 120.

More specifically, as illustrated in FIG. 6, the spring 140 may include a first spring 141 connecting the mirror 120 to the first and second gimbals 131 and 132 and a second spring 142 connecting the substrate 110 to the second gimbal 132.

In other words, the mirror 120 may be connected to the first and second gimbals 131 and 132 via the first spring 141. The second gimbal 132 may be connected to the substrate 110 via the second spring 142.

The substrate 110 may be a semiconductor substrate made of silicon (Si).

The substrate 110 may be spaced apart from the outer surface of the gimbal 130 and may be connected to the gimbal 130 via the spring 140.

Since the substrate 110 may be disposed so as to be spaced apart from the outer surface of the second gimbal 132, the openings 111 and 112 may be defined between the substrate 110 and the second gimbal 132.

The substrate 110 may be divided into a plurality of substrates 110 by the combs 160, which will be described later, and which are connected to each other via insulation layers 170.

As illustrated in FIG. 6, the substrate 110 may include an upper substrate 110a, which is disposed above the comb 160, and a lower substrate 110b, which is disposed below the comb 160.

Here, the upper and lower substrates 110a and 110b may be connected to each other via the insulation layers 170. More specifically, the associated components may be connected to one another in the order of the upper substrate 110a-the insulation layer 170-the second spring 142-the insulation layer 170-the lower substrate 110b.

The reason why the insulation layers 170 are interposed between the substrates is to insulate the first and second combs 161 and 162 from each other in order to measure the capacitance value of the comb structure to be described later.

Coils 150 may be disposed at the gimbal 130. As illustrated in FIG. 6, the coils 150 may be disposed not only at the first and second gimbals 131 and 132 but also at portions of the first and second springs 141 and 142.

As described previously, since the magnets 30 and 40 are disposed adjacent to the electromagnetic-driving-type MEMS scanner 100 according to the present disclosure, a magnetic field may be created in the MEMS scanner 100.

Accordingly, when current flows through the coils 150, electromagnetic force may be generated by interaction between the current and the magnetic field formed around the magnets 30 and 40, and the electromagnetic force may be used the driving force for controlling the rotational angle of the mirror 120.

Specifically, by virtue of the electromagnetic force that is generated by the current flowing through the coils 150, the mirror 120 may be able to rotate about the first spring 141, and the first and second gimbals 131 and 132 may be able to rotate about the second spring 142.

The rotation of the first and second gimbals 131 and 132 may be understood to mean rotation of the mirror 120 connected thereto via the first spring 141. Accordingly, the MEMS scanner 100 according to the first embodiment of the present disclosure shown in FIG. 6 may be understood to mean a biaxial driving scanner.

Among the rotational axes of the mirror 120, the axis that extends through the first spring 141 may be referred to as a vertical axis or a Y-axis, and the axis that extends through the second spring 142 may be referred to as a horizontal axis or an X-axis.

In order to realize rotation of the mirror 120 about the X-axis and the Y-axis, current having a specified resonant frequency may be caused to flow through the coil 150.

In other words, when current IA that has a resonant frequency of A, which may be specified through design or experimentation, flows through the coils 150, the mirror 120 may rotate about the Y-axis. Meanwhile, when current IB that has a resonant frequency of B flows through the coils 150, the mirror 120 may rotate about the X-axis.

Here, the rotational angles of the mirror 120 about the X-axis and the Y-axis may be adjusted by increasing or decreasing the intensities of the currents IA and IB.

The first and second gimbals 131 and 132 and the first and second springs 141 and 142, which are components for rotatably supporting the mirror 120, may be made of elastic bodies.

The combs 160 may be formed between the substrate 110 and at least one of the spring 140 and the gimbal 130 so as to detect rotational then angle of the mirror 120. The combs 160 may include a plurality of combs.

The combs 160 may include a first comb 161 and a second comb 162.

The first comb 161 may be composed of a plurality of cantilever-shaped members, which are arranged at predetermined intervals and which extend from the substrate 110.

The second comb 162 may be composed of a plurality of cantilever-shaped members, which are arranged at predetermined intervals and which extend from at least one of the spring 140 and the gimbal 130 adjacent to the first comb 161.

As illustrated in FIG. 6, the first and second combs 161 and 162, which are provided in the MEMS scanner 100 according to the first embodiment of the present disclosure, may be formed (i) between the left lower end of the upper substrate 110a and the left upper end of the second spring 142, (ii) between the right lower end of the upper substrate 110a and the right upper end of the second spring 142, (iii) between the left upper end of the lower substrate 110b and the left lower end of the second spring 142 and (iv) between the right upper end of the lower substrate 110b and the right lower end of the second spring 142 so as to be crossed with each other. In other words, each of the plurality of first and second combs 161 and 162 of the comb 160 may be configured to have a comb shape.

As described above, the first and second gimbals 131 and 132 and the first and second springs 141 and 142 may be deformed (that is, twisted or displaced vertically) upon rotation of the mirror 120.

Here, the distance between the first and second combs 161 and 162 may vary with rotation of the mirror 120. Specifically, the distance between the first and second combs 161 and 162 may vary in the Z-axis (an axis perpendicular both to the X-axis and to the Y-axis) direction upon rotation of the mirror 120 about the Y-axis, and the distance between the first and second combs 161 and 162 may be twisted and deformed about the X-axis upon rotation of the mirror 120 about the X-axis.

The MEMS scanner 100 according to the present disclosure may detect the rotational angle of the mirror 120 by measuring a capacitance value corresponding to the distance between the first and second combs 161 and 162.

Capacitance may be present between (semi)conductors, which are insulated from each other, and a capacitance value may be proportional to a surface area (area) of (semi) conductors and inversely proportional to the distance between (semi)conductors insulated from each other.

Since the first and second combs 161 and 162 according to the present disclosure are respectively formed on the semiconductor substrate 110 and the spring 140, the capacitance between the first and second combs 161 and 162 may vary with a change in the distance between the first and second combs 161 and 162.

Here, it is possible to detect the rotational angle of the mirror 120 by measuring the varying value of capacitance.

A conventional electromagnetic-driving-type MEMS scanner has a problem in which an additional process of mounting a component for detecting rotation of the mirror (for example, a strain gauge or the like) must be performed after performing a process of preparing a component for rotating the mirror. In contrast, since the MEMS scanner 100 according to the present disclosure is constructed such that the combs 160 are formed on the substrate 110 and the spring 140, it is possible to manufacture the spring 140, the gimbal 130 and the substrate 110, which are components for rotating the mirror 120, and the comb 160, which is a component for detecting rotation of the mirror 120, through a single process.

Specifically, since the MEMS scanner 100 according to the present disclosure omits a conventional additional process of mounting a component for detecting rotation of the mirror, there are advantages in that manufacturing time and costs are reduced, the manufacturing process is facilitated, and process compatibility is improved.

Furthermore, since the present disclosure adopts an electromagnetic driving system, it is possible to realize rotation of the mirror 120 within a wide angle and at a high speed. In addition, power consumption required for rotation of the mirror 120 is reduced by virtue of reduction of the load applied to the spring 140, and the durability of the spring 140 is improved, compared to a conventional MEMS scanner equipped with an additional component such as a strain gauge.

Although the MEMS scanner 100 of a biaxial (X-axis and Y-axis) driving manner according to the present disclosure has been described with reference to FIG. 6, it goes without saying that the present disclosure may also be applied to a MEMS scanner 100 adopting the single-axis driving manner shown in FIG. 7.

Furthermore, although the MEMS scanner 100 adopting the biaxial driving manner according to the first embodiment is constructed so as to detect rotation of the mirror 120 about the X-axis and Y-axis by means of the comb 160 disposed on the X-axis, the MEMS scanner 100 may further include the comb 160 disposed on the Y-axis in order to precisely detect rotation of the mirror 120. In this context, it goes without saying that, the greater the number of combs 160, the greater the improvement in sensitivity in detection of the rotational angle of the mirror 120.

To this end, the insulation layer 170 may be further provided on the Y-axis so as to divide the substrate 110 into four sections, as in the MEMS scanner 100 according to the third embodiment of the present disclosure shown in FIG. 8, and the combs 160 may be further provided on the Y-axis, although this is not illustrated in the drawings.

Alternatively, the insulation layers 170 may be further provided in diagonal directions between the X-axis and the Y-axis so as to divide the substrate 110 into eight sections, as in the MEMS scanner 100 according to the fourth embodiment of the present disclosure shown in FIG. 9, and the combs 160 may further be provided on the X-axis adjacent to the insulation layer 170 so as to more precisely detect rotation of the mirror 120, although this is not illustrated in the drawings.

Unlike the MEMS scanner 100 according to the first embodiment of the present disclosure, the MEMS scanner 100 according to the fifth embodiment of the present disclosure shown in FIG. 10 may further include the first and second combs 161 and 162, which are formed (ii) between the lower end of the upper substrate 110a and the upper end of the second gimbal 132 and (iii) between the upper end of the lower substrate 110b and the lower end of the second gimbal 132, so as to be crossed with each other, in addition to the first and second combs 161 and 162, which are formed (i) between the upper and lower substrates 110a and 110b and the second springs 142.

Here, since the combs 160 are disposed in a wider range, it is possible to more precisely detect the rotational angle of the mirror 120.

Although the mirror 120, the gimbals 130 and the coils 150 may have a circular shape and may be symmetrical in vertical and horizontal directions, as in the first embodiment shown in FIG. 6, they are not limited thereto. The components may have an elliptical shape or a rectangular shape in addition to the circular shape and may be symmetrical or asymmetrical, as in the sixth to ninth embodiments shown in FIG. 11.

Furthermore, the MEMS scanner 100 according to the present disclosure may also be applied not only to a resonant structure but also to non-resonant structure.

In other words, the MEMS scanner 100 according to the present disclosure may make it easy to adjust the number or the position of combs 160 according to the shape or the rotational direction of the mirror 120.

Hereinafter, the combs 160 according to the present disclosure will be described concretely with reference to FIGS. 12 and 13.

Figure 12:
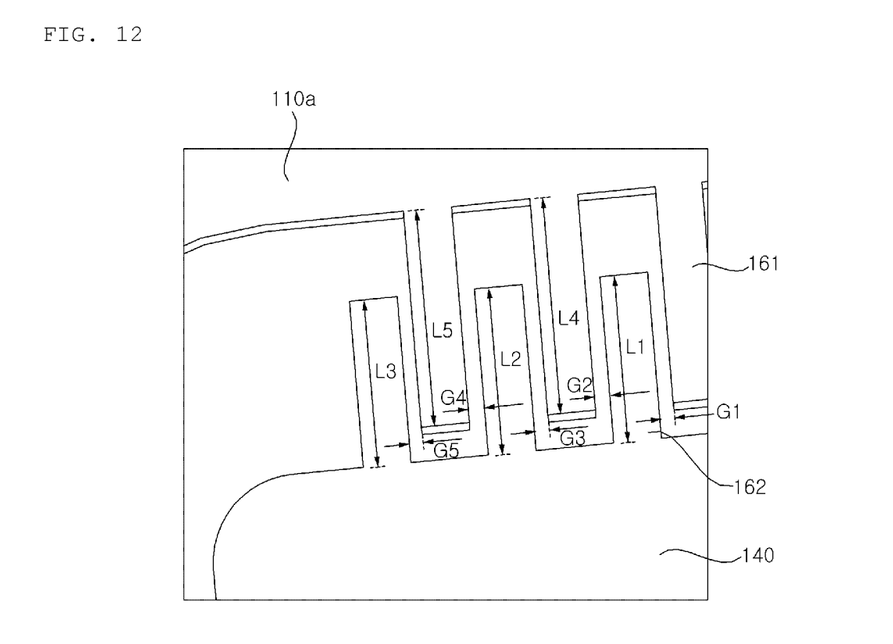
FIG. 12 is an enlarged view illustrating the first and second combs according to the present disclosure.

FIG. 12 is an enlarged view illustrating the first and second combs according to the present disclosure. FIG. 13 is an enlarged view illustrating the first and second combs in addition to the spring according to the present disclosure.

As described above, the distance between the first and second combs 161 and 162 may vary with the rotation of the mirror 120.

If there is the case in which the first and second combs 161 and 162 come into contact with each other during the rotation of the mirror 120, the rotational angle of the mirror 120 may be limited, and the durability of the first and second combs 161 and 162 themselves may be deteriorated. In addition, there may be a problem in which the reliability of detection of the rotational angle of the mirror 120 through the first and second combs 161 and 162 is lowered.

Accordingly, there is a need to design the sizes of the first and second combs 161 and 162 and the distance therebetween such that the first and second combs 161 and 162 do not come into contact with each other during rotation of the mirror 120.

The thickness of each of the first and second combs 161 and 162 may be designed such that the first and second combs 161 and 162 do not come into contact with each other. The thickness of each of the first and second combs 161 and 162 may decrease moving toward a portion of a plurality of second combs 162 at which deformation (twisting or vertical or horizontal displacement) thereof is increased.

Figure 13:
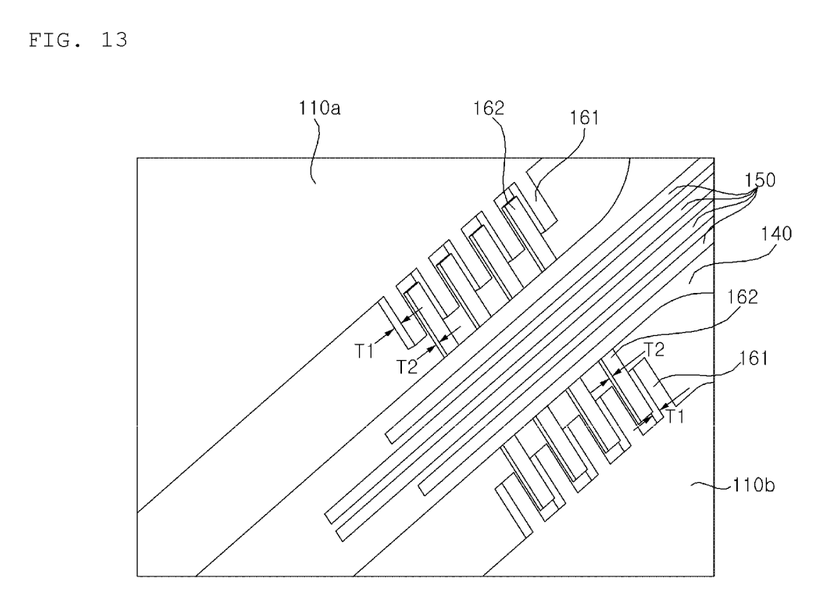
FIG. 13 is an enlarged view illustrating the first and second combs in addition to the spring according to the present disclosure.

As illustrated in FIG. 13, the thickness T2 of the second comb 162 may be smaller than the thickness T1 of the first comb 161. The thickness T2 of the second comb 162 may be equal to the thickness of the spring 140.

Although the first comb 161 is formed at the stationary substrate 110, the second comb 162 is formed at the spring 140, which is deformed with rotation of the mirror 161. Reducing the load or stress applied to the spring 140 by reducing the thickness of the second comb 162 may be advantageous in reducing power consumption required for rotation of the mirror 120, increasing the durability of the spring 140 and reducing manufacturing costs.

The length of each of the first and second combs 161 and 162 may be designed such that the first and second combs 161 and 162 do not come into contact with each other, the substrate 110, or the spring 140 during rotation of the mirror 120. The length of each of the first and second combs 161 and 162 may be decreased moving toward a portion of a plurality of second combs 162 at which deformation (twisting or vertical or horizontal displacement) thereof is increased.

By way of example, when deformation of the second comb 162 is increased moving leftwards in FIG. 12, the lengths of the individual first combs 161 satisfy $L5<L4$, and the lengths of the individual second combs 162 satisfy $L3<L2<L1$.

The distance between the first and second combs 161 and 162 may be designed such that the first and second combs 161 and 162 do not come into contact with each other during rotation of the mirror 120. The distance between the first and second combs 161 and 162 may be increased moving toward a portion of a plurality of second combs 162 at which deformation thereof is increased.

By way of example, when deformation of the second comb 162 is increased moving leftwards in FIG. 12, the distance between the first and second combs 161 and 162 satisfies $G5>G4>G3>G2>G1$.

The scope of the present disclosure should be defined by rational interpretation of the appended claims, and the present disclosure covers all modifications and variations within the scope of the present disclosure.

DESCRIPTION OF REFERENCE NUMERALS

1: vehicle
10: light output unit
20: scanner module
30, 40: magnet
50: upper case
60: lower case
70: yoke
80: transparent cover portion
100: MEMS scanner
110: substrate
120: mirror
130: gimbal
140: spring
150: coil
160: comb
170: insulation layer

The invention claimed is:

1. A MEMS scanner comprising:
a mirror rotatable about at least one rotational axis;
a gimbal disposed outside the mirror;
a spring connected to the gimbal on a same line as the rotational axis of the mirror;
a substrate spaced apart from an outer surface of the gimbal and connected to the gimbal via the spring;
a coil disposed on the gimbal so as to adjust a rotational angle of the mirror by generating electromagnetic force by interaction with a magnetic field, which is first formed therearound based on current flowing therethrough; and
a plurality of combs provided between the substrate and at least one of the spring or the gimbal so as to detect a rotational angle of the mirror,
wherein the at least one of the spring or the gimbal is adjacent to the substrate, and
wherein the gimbal comprises:
a first gimbal disposed so as to be spaced apart from an outer surface of the mirror, and
a second gimbal disposed so as to be spaced apart from an outer surface of the first gimbal, and
wherein the spring comprises:
a first spring connecting the mirror to the first and second gimbals, and
a second spring connecting the substrate to the second gimbal.

2. The MEMS scanner according to claim 1, wherein the plurality of combs comprises:
a plurality of cantilever-shaped first combs, which are arranged at predetermined intervals and which extend from the substrate; and
a plurality of cantilever-shaped second combs, which are arranged at predetermined intervals and which extend from at least one of the spring or the gimbal adjacent to the first combs.

3. The MEMS scanner according to claim 2, wherein the rotational angle of the mirror is detected by measuring a capacitance value corresponding to a distance between the first and second combs, which varies with rotation of the mirror.

4. The MEMS scanner according to claim 1, wherein the mirror is rotatable about the first spring, and the first and second gimbals are rotatable about the second spring.

5. The MEMS scanner according to claim 3, wherein the substrate is divided into a plurality of substrates by the first and second combs, and the plurality of substrates are connected to each other via an insulation layer.

6. The MEMS scanner according to claim 3, wherein a thickness of each of the first and second combs is decreased moving toward a portion of the plurality of second combs at which deformation thereof is increased.

7. The MEMS scanner according to claim 3, wherein a length of each of the first and second combs is decreased moving toward a portion of the plurality of second combs at which deformation thereof is increased.

8. The MEMS scanner according to claim 3, wherein a distance between the first and second combs is increased moving toward a portion of the plurality of second combs at which deformation thereof is increased.

9. The MEMS scanner according to claim 3, wherein a thickness of each of the plurality of second combs is smaller than a thickness of each of the plurality of first combs.

* * * * *